United States Patent
Saha et al.

(10) Patent No.: US 8,510,751 B2
(45) Date of Patent: Aug. 13, 2013

(54) OPTIMIZING WORKFLOW ENGINES

(75) Inventors: Dhrubajyoti Saha, Nagavarapalya (IN); Smruti R. Sarangi, Nagavarapalya (IN)

(73) Assignee: International Business Machines Corporation, Armonk, NY (US)

( * ) Notice: Subject to any disclaimer, the term of this patent is extended or adjusted under 35 U.S.C. 154(b) by 577 days.

(21) Appl. No.: 12/726,798

(22) Filed: Mar. 18, 2010

(65) Prior Publication Data

US 2011/0231849 A1     Sep. 22, 2011

(51) Int. Cl.
  *G06F 3/00* (2006.01)
  *G06F 9/44* (2006.01)
  *G06F 9/45* (2006.01)

(52) U.S. Cl.
  USPC ............. 719/313; 717/132; 717/144

(58) Field of Classification Search
  None
  See application file for complete search history.

(56) References Cited

U.S. PATENT DOCUMENTS

| | | | |
|---|---|---|---|
| 6,038,538 A | 3/2000 | Agrawal et al. | |
| 6,430,590 B1 | 8/2002 | Fischer | |
| 6,763,369 B1 | 7/2004 | Ytuarte et al. | |
| 7,409,689 B2 | 8/2008 | Jones et al. | |
| 7,577,554 B2 | 8/2009 | Lystad et al. | |
| 7,945,898 B1 * | 5/2011 | Episkopos et al. | 717/132 |
| 8,046,751 B1 * | 10/2011 | Avadhanula et al. | 717/144 |
| 8,132,148 B2 * | 3/2012 | Williams et al. | 719/313 |
| 8,359,583 B2 * | 1/2013 | Chou et al. | 717/132 |
| 2002/0188650 A1 * | 12/2002 | Sun et al. | 709/105 |
| 2004/0260590 A1 | 12/2004 | Golani et al. | |
| 2007/0021995 A1 | 1/2007 | Toklu et al. | |
| 2007/0162457 A1 * | 7/2007 | Barcia et al. | 707/10 |
| 2008/0098375 A1 | 4/2008 | Isard | |
| 2008/0222645 A1 | 9/2008 | Buco et al. | |
| 2008/0288595 A1 * | 11/2008 | Liu et al. | 709/206 |
| 2009/0083390 A1 * | 3/2009 | Abu-Ghazaleh et al. | 709/209 |
| 2010/0093318 A1 * | 4/2010 | Zhu et al. | 455/414.1 |
| 2010/0195140 A1 * | 8/2010 | Shepherd et al. | 358/1.15 |
| 2011/0276915 A1 * | 11/2011 | Freire et al. | 715/772 |

OTHER PUBLICATIONS

"Applying Graph Search Techniques for Workflow Verification", Perumal, 2007, pp. 1-10.*
"A Novel Graph Based Approach for Automatic Composition for High Quality Grid Workflows" Qin, 2009, pp. 1-10.*
"Theoretical Framework for Eliminating Redundance in Workflows", Saha, 2009, pp. 1-8.*
"Open Workflows: Context-Dependent Construction and Execution in Mobile Wireless Settings", Thomas, 2009, pp. 1-14.*
Honig et al. A Meta-Algorithm for scheduling multiple DAGs in homogeneous system environments. Parallel and Distributed Computing Systems, 2006.
Fechner et al. Fault-tolerant static scheduling for grids. Parallel and Distributed Processing, 2008. IPDPS 2008.
Georgiou et al. Optimally work-competitive scheduling for cooperative computing with merging groups. SIAM J. Comput. vol. 34, No. 4, pp. 848-862, 2005.

(Continued)

*Primary Examiner* — Tuan Dao
(74) *Attorney, Agent, or Firm* — Ryan, Mason & Lewis, LLP

(57) ABSTRACT

A system and computer program product for implementing a workflow include merging a workflow to create a virtual graph, wherein the workflow comprises two or more directed acyclic graphs (DAGs), mapping each of one or more nodes of the virtual graph to one or more physical nodes, and using a message passing scheme to implement a computation via the one or more physical nodes.

16 Claims, 5 Drawing Sheets

(56) References Cited

OTHER PUBLICATIONS

Sun et al. Merging Workflows: A New Perspective on Connecting Business Processes. Decision Support Systems 42(2006) 844-858.

Ahmad et al. Analysis, Evaluation, and Comparison of Algorithms for Scheduling Task Graphs on Parallel Processors. (1996).

Bae et al. Process Mining, Discovery, and Integration Using Distance Measures, ICWS'06 Proceedings of the IEEE International Conference on Web Services, pp. 479-488, 2006.

* cited by examiner

DAG 1     DAG 1     COMBINED GRAPH

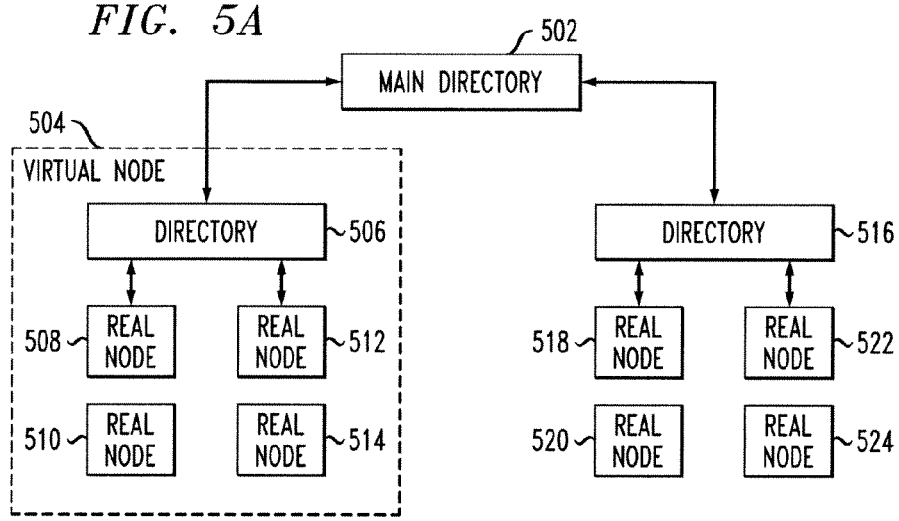
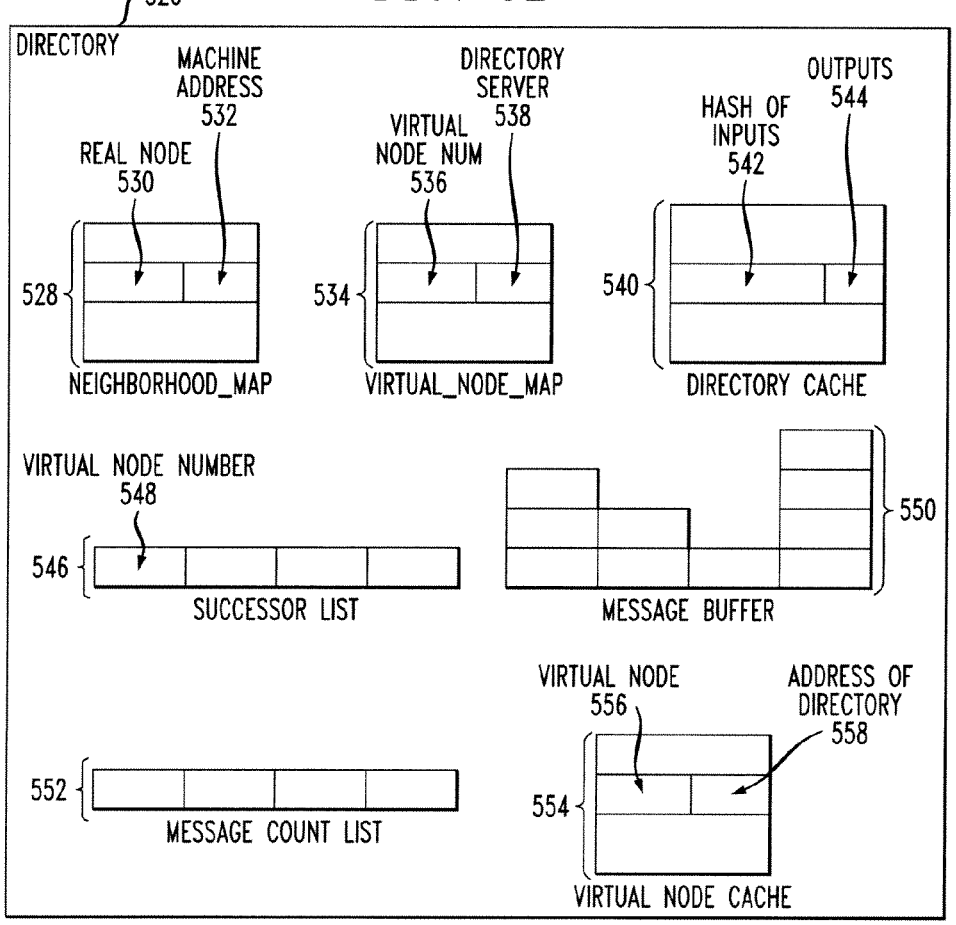

STEADY STATE OPERATION

OPTIMIZING WORKFLOW ENGINES

FIELD OF THE INVENTION

Embodiments of the invention generally relate to information technology, and, more particularly, to workflow engines.

BACKGROUND OF THE INVENTION

A workflow engine is a software system used to run a multitude of tasks. Each task is typically the invocation of an executable program. These tasks may have precedence relationships between them. Thus, the workflow may be looked upon as a graph, where each node represents a task to be performed, and an edge represents a precedence relationship. In a majority of cases, the workflow task graph can be acyclic.

Typically, users run a set of workflows at one go. In this set, users can create copies of a workflow for different inputs. Secondly, users can also create workflows by changing existing workflows slightly. As such, it would be a sub-optimal choice to consider each workflow as a separate entity. To minimize computation in the workflow set and take advantage of the common structure, it would be desirable to merge all of the workflow directed acyclic graphs (DAGs) into a single graph.

Existing approaches disadvantageously do not take dynamic information into account. It is possible that two nodes have different parents, but do the same computation. It is also possible that two nodes do different computations, but use the same software. Hence, it would be desirable to run such nodes on the same machine, for example, to take advantage of caching.

SUMMARY OF THE INVENTION

Principles and embodiments of the invention provide techniques for optimizing workflow engines. An exemplary method (which may be computer-implemented) for implementing a workflow, according to one aspect of the invention, can include steps of merging a workflow to create a virtual graph, wherein the workflow comprises two or more directed acyclic graphs (DAGs), mapping each of one or more nodes of the virtual graph to one or more physical nodes, and using a message passing scheme to implement a computation via the one or more physical nodes.

One or more embodiments of the invention or elements thereof can be implemented in the form of a computer product including a tangible computer readable storage medium with computer useable program code for performing the method steps indicated. Furthermore, one or more embodiments of the invention or elements thereof can be implemented in the form of an apparatus including a memory and at least one processor that is coupled to the memory and operative to perform exemplary method steps. Yet further, in another aspect, one or more embodiments of the invention or elements thereof can be implemented in the form of means for carrying out one or more of the method steps described herein; the means can include (i) hardware module(s), (ii) software module(s), or (iii) a combination of hardware and software modules; any of (i)-(iii) implement the specific techniques set forth herein, and the software modules are stored in a tangible computer-readable storage medium (or multiple such media).

These and other objects, features and advantages of the present invention will become apparent from the following detailed description of illustrative embodiments thereof, which is to be read in connection with the accompanying drawings.

BRIEF DESCRIPTION OF THE DRAWINGS

FIG. 5A is a block diagram illustrating an example embodiment, according to an aspect of the invention;

FIG. 5B is a block diagram illustrating an example embodiment, according to an aspect of the invention;

DETAILED DESCRIPTION

Figure 1:
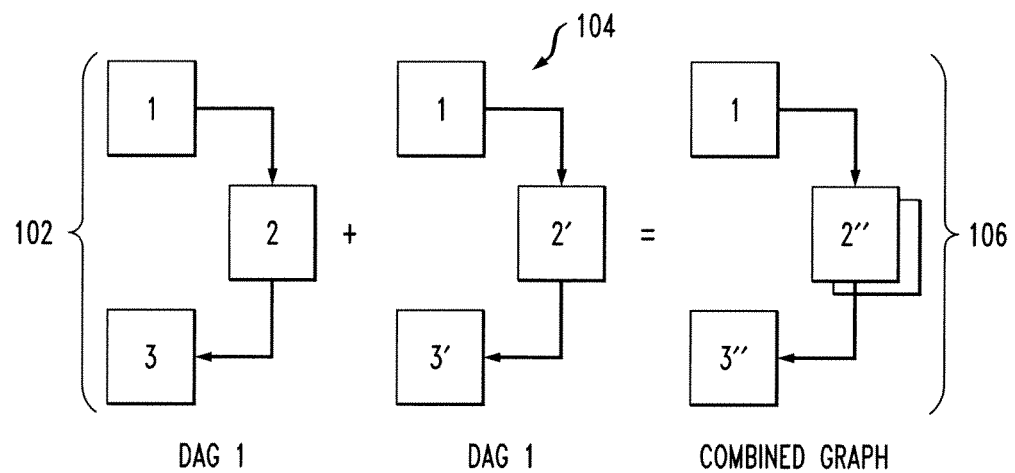
FIG. 1 is a diagram illustrating an exemplary merging of workflow directed acyclic graphs (DAGs), according to an embodiment of the present invention.

Principles of the invention include running a set of workflows on a cluster of processing elements. One or more embodiments of the invention include merging a set of workflow directed acyclic graphs (DAGs) into one large graph that minimizes the number of nodes statically. Also, each vertex can be mapped to a processing node.

In contrast to existing approaches, one or more embodiments of the invention can include merging vertices even if they do not have the same predecessors and successors. The techniques detailed herein can include assigning vertices to one virtual node, and using a directory-based system in the virtual node directory to keep track of the different merging operations that have been done. Also, one or more embodiments of the invention include merging vertices to virtual nodes to reduce license uses, increase locality in caching-paging behavior, and decrease communication time.

Additionally, the techniques described herein include a practical system which can use a message passing scheme to implement the computation represented by a merged workflow DAG. Further, as detailed herein, all of the merged nodes can be represented by one virtual node. One or more embodiments of the invention also include identifying similar jobs, marking such jobs with the same label, and assigning them to the same virtual node. Additionally, the directory structure in a virtual node can manage the caching and implementation of the data.

As described herein, the terms "node" and "graph" are not interchangeable. By way of illustration, consider a map of cities, where the cities are connected by roads. In such an example, a city is a node, a road is an edge, and the entire map is a graph. With respect to a virtual node and a virtual graph, consider, by way of example, two graphs: A - - - B and A' - - - B'. The two graphs can be merged to make the graph A" - - - B". In such an example, the nodes A and A' have been merged to form the virtual node A". Likewise is the case for B and B', as they have been merged to form node B".

By way of illustration, consider a message with a practical example. As such, consider a simple graph of two tasks, X and Y. The graph looks as follows: X - - - >Y. Here, Y executes after X. For example, the first task can be "Find all files with the name 'Z'" and the second task can be "Count the number of lines in each of these files." Such a graph of tasks is referred to as a workflow.

By way of example, this graph can execute using one or more embodiments of the invention as follows. The first task corresponding to node X will execute on a central processing unit (CPU) (a real node). X will send a message to Y, with the message containing the output of the computation in X, and the details of the computation in Y. In this example, the message would appear as follows:

Output of X: All of the files with the name "Z."
Computation to be performed at Y: Count the number of lines in each of these files.

As detailed herein, and in contrast to the existing approaches, one or more embodiments of the invention include creating a virtual node to merge nodes so that it computations can be mapped to physical nodes and/or computations can be queued in a node depending on resources and licenses available in that node. The number of computations can be reduced by eliminating redundant computations. Also, if multiple workflow nodes are merged to one node, the node can be pinned to a free machine, thereby simplifying the scheduling algorithm. Also, the node can be split dynamically at run-time to increase throughput and improve scheduling, thereby allowing more flexibility while scheduling jobs.

Additionally, by pinning nodes to a set of machines, one or more embodiments of the invention can take advantage of caching and paging, and eliminate start-up overheads for any software that might need to run. Further, if n nodes are merged into one virtual node, one or more embodiments of the invention can increase the delay if the restriction of serial execution is imposed. However, this can allow one to keep a better track of software licenses. Secondly, if software licenses are tied to a node, then one or more embodiments of the invention can include running multiple copies of software without requiring more licenses.

FIG. 1 is a diagram illustrating an exemplary merging of workflow directed acyclic graphs (DAGs), according to an embodiment of the present invention. By way of illustration, FIG. 1 depicts workflow DAG 1 (component 102) containing nodes 1, 2 and 3, and workflow DAG 2 (component 104) containing nodes 1, 2' and 3'. As depicted in FIG. 1, graph 102 and graph 104 are merged into one large graph, graph 106 containing nodes 1, 2" and 3". This graph (component 106) minimizes the number of nodes statically. Each vertex in the node is mapped to a processing node.

As depicted in FIG. 1, the nodes are being merged pairwise. By way of illustration, because nodes [1] and [1] are the same, they can be merged, and the final node in component 106 in FIG. 1 is 1. However, the labels are different for the rest of the nodes. For the second node, the labels are 2 and 2', and for the third node the labels are 3 and 3'. They are merged pairwise to form 2" and 3", respectively.

By way of example, consider two DAGs. Every node is labeled, and two nodes have the same numerical label if they represent the same computation. Typically, they would represent different runs of the same program (for example, program x). The difference between x and x' is that they have different inputs and different outputs. If the DAGs were to be statically merged, the graph would be represented by graph 202 in FIG. 2.

Figure 2:
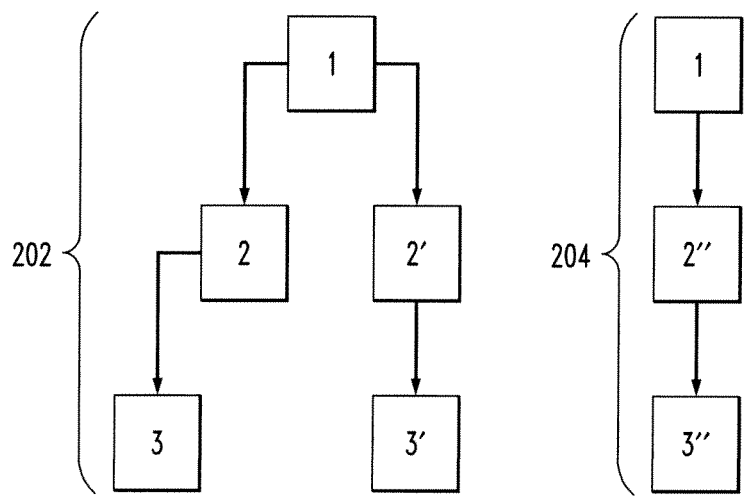
FIG. 2 is a diagram illustrating exemplary graphs, according to an embodiment of the present invention.

FIG. 2 is a diagram illustrating exemplary graphs, according to an embodiment of the present invention. By way of illustration, FIG. 2 depicts graph 202 and graph 204. Graph 202 is being compressed to graph 204. Here node (2") represents two computations namely those of nodes, 2 and 2'. When graph 204 will be ready to run, the system will create a virtual node with the name (2"). Depending on the resources and licenses available, 2" might map to two physical processing nodes, or it can be just one node, with jobs queued if necessary. Also, one or more embodiments of the invention include designing a distributed data structure to manage the structure of these virtual nodes.

The architecture of one or more embodiments of the invention includes using asynchronous messages. In graph 204 of FIG. 2, 3" needs to know if a certain message coming from 2" corresponds to DAG1 or DAG2 (refer to graph 202). Consequently, every message that is sent needs to have the identification (ID) of the original DAG to which it corresponds. As such, one or more embodiments of the invention include using a set of mechanisms to keep track of the messages that are sent. Additionally, the techniques detailed herein can also include optimizing the system by taking advantage of caching results.

By way of example and without loss of generality, assume that two DAGs are being merged, initially into one graph. In merging DAGs (for example, given two DAGs) to make a virtual graph, every node gets numbered. In one or more embodiments of the invention, one can also assume that every node has a unique number in the first DAG. This can be achieved by standard techniques such as, for example, a depth-first search. Likewise, for the second DAG, the nodes can be uniquely numbered. However, for each node in the second DAG, if there is a matching node (same computation) in the first DAG, that node is given the same number.

One or more embodiments of the invention include maximizing the number of nodes in DAGs (both DAGs, using the example above) having the same numerical labels. The techniques detailed herein can include searching for an unmapped node with the same computation, in a first DAG, for every node in a second DAG in topological order. If a node is not found, it is assigned a new numerical label.

Continuing with the example described above, after labeling the vertices, there are two DAGs $(V_1, E_1)$ and $(V_2, E_2)$, where V is the set of vertices and E is the set of edges. A new graph $(V_1 \cup V_2, E_1 \cup E_2)$ can be created. Let P and S be the set of predecessor and successors for every node N. If $N_1$ is being merged with $N_2$, then there will be a new node in the final graph: $N=N_1+N_2$, and the set of predecessors, P, of node N will be $P=P_1 \cup P_2$, and successors $S=S_1 \cup S_2$.

As detailed above, multiple vertices, $V_1, V_2, \ldots V_n$, are being merged into one vertex V. As such, one or more embodiments of the invention include mapping nodes of the virtual graph to real nodes. Vertices in the final graph are split into subsets called neighborhoods. Each neighborhood has a dedicated node called a directory, wherein the directory maintains the set of real processing nodes of which a virtual node is made. The data structure can be a simple list where each entry is a hash-table of the form: Virtual Node (real node, machine address), (real node, machine address). An example could include, for instance, $V (V_{-1}, M_1), (V_2, M_2) \ldots$ (see, also, for example, FIG. 3).

Figure 3:
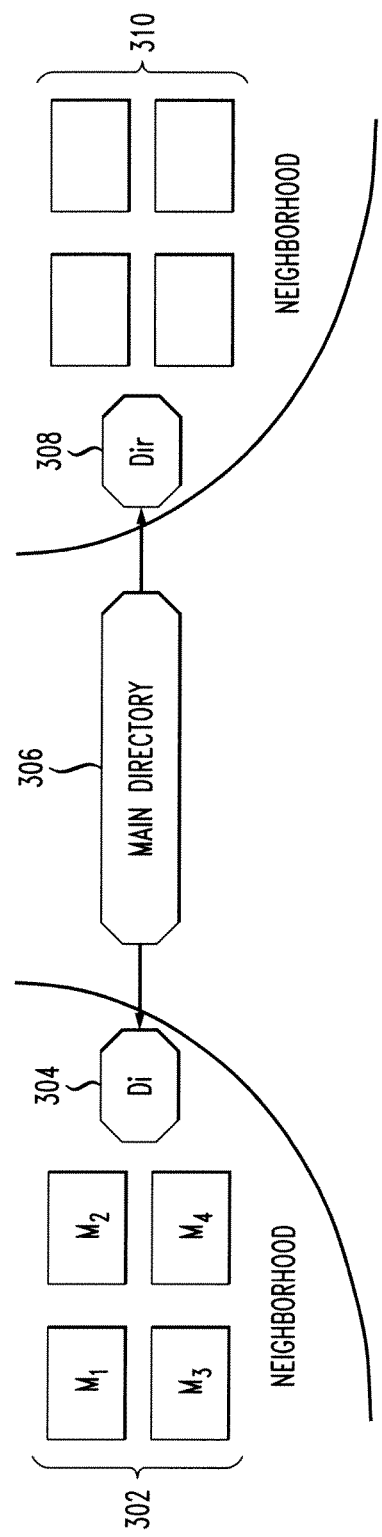
FIG. 3 is a diagram illustrating an exemplary virtual node, according to an embodiment of the present invention.

FIG. 3 is a diagram illustrating an exemplary virtual node, according to an embodiment of the present invention. By way of illustration, FIG. 3 depicts neighborhoods 302 and 310, directories 304 and 308, as well as a main directory 306. Each virtual node includes the mapping of all of the nodes contained therein. As used herein, this can be referred to as neighborhood_map. Also, as depicted in FIG. 3, there is a main directory 306 that contains the mapping between VirtualNode and its neighborhood (for example, components 302 and 310). The mapping is of the form: VirtualNode number Address of the directory server. As used herein, this can be referred to as virtual_node_map. Further, to minimize lookups, every machine can cache information. As used herein, this can be referred to as the virtual_node_cache.

Figure 4:
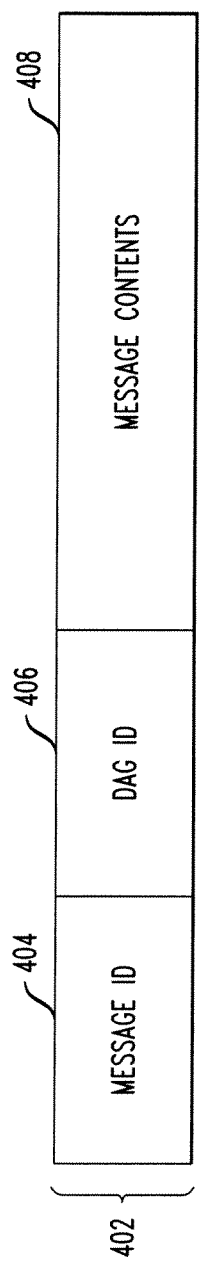
FIG. 4 is a diagram illustrating exemplary structure of a message, according to an embodiment of the present invention.

One or more embodiments of the invention also include message passing protocol. FIG. 4 is a diagram illustrating exemplary structure of a message 402, according to an embodiment of the present invention. By way of illustration, FIG. 4 depicts a message identification (ID) component 404, a DAG ID component 406 and a message contents component 408. Each message will have a message ID. This ID is local to each processing node, and it is assigned in a strictly increasing order. Also, every individual DAG is assigned a unique ID. The second field in the message is the ID of the original DAG of which it is a part.

In one or more embodiments of the invention, a message sent from a home directory to a target directory can include (as depicted in FIG. 4) a message ID, an ID of the original graph, and message details. A message ID is a unique number assigned to each message ID of the original graph. Also, every original directed acyclic graph (DAG) is assigned a unique number. Each graph is representing a set of tasks, which can include an ordering of tasks that need to be implemented. Tasks are implemented in a distributed fashion. Once one task finishes, the virtual node sends a message to the directory with the details of the subsequent computation. Every message has the ID of the DAG to which this computation belongs.

Message details/contents can include two kinds of information. One kind of information can include inputs to the task being implemented. This could, for example, be of the form of Name of input 1, Values Name of input 2, values, etc. The other kind of information can include details of the task that needs to be implemented, such as, for example, the name of the program to be implemented, as well as its path.

In one or more embodiments of the invention, at the outset, every virtual node that has a node that didn't have any predecessors will fire a message. The messages will be routed to their respective destinations, and once these asynchronous messages reach their destinations, they will be processed by the virtual node directories. Additionally, some of these messages may be queued by the system, and some messages might start computations in compute nodes. After the computations are over, new messages will be created and sent to their respective destinations. In this manner, the computation will continue.

As described herein, nodes can be split into two types. One type includes stateless compute nodes, and the other includes stateful directories. All of the data structures are maintained in the directory nodes.

Additionally, when a node is formed by merging two nodes in $DAG_1$ and $DAG_2$, the new virtual node will have a list corresponding to each ID (1 and 2) of the nodes, which are its successors in the new DAG. These should be the numbers of the virtual nodes, and as used herein, such a list can be referred to as the successor_list. For example, this can be a hash-table of the form: (VirtualNode, DAG ID) (VirtualNode 1), (VirtualNode 2) . . . . Each virtual node also needs to be aware of the number of messages it needs to receive from its predecessors before it begins its own processing. It will thus need to have an integer corresponding to each DAG ID, which will denote the number of messages it needs to receive before it begins implementation. As used herein, this can be referred to as the message_count_list.

Further, in one or more embodiments of the invention, every directory needs a buffer corresponding to each ID to store messages. If a certain node requires three messages, then two messages need to be buffered until the third one arrives. As used herein, this can be referred to as the message_ buffer. For example, this list can be a hash-table of the form: (VirtualNode ID, DAG ID) (Message List).

One or more embodiments of the invention can include starting with nodes that do not have any successors' firing messages. Consider the steady state. When a compute node is done with its computation, it sends the compute message it received back to its directory with the results of the computation. The directory thus knows that the computation is over. From the DAG ID, the home directory (that is, the directory in which the computation is taking place) finds the set of successors from the successor_list. Because each successor is a virtual node, the home directory uses the virtual_node_cache to find the directory of the successor (referred to as the target directory). The home directory creates a message with the results of the computation, adds the "DAG ID" to the message and sends the message to the target directory.

When a message arrives at a directory, the directory will parse the message and check its "DAG ID." Next, the directory will put the message in the corresponding buffer in the message_buffer. If the size of the buffer is equal to the number of messages it has to have before beginning its execution (check the message_count_list), the target directory will start the process of firing a job. The directory will find the compute node corresponding to the DAG ID from the neighborhood_ map, or assign a new node, and send the message as a job.

One or more embodiments of the invention can also include optimizing the working of this algorithm. Each directory can have a cache that saves the message contents and the output. If another message arrives with the same contents, it need not start a new computation. The directory can get the value from the cache, for example, as follows. The message (that is, job command) is sanitized. If it is a script invocation, then all paths are replaced with the absolute paths. Also, all double spaces and new lines are replaced with single spaces. A 512 bit MD5 (Message-Digest algorithm 5) hash of the sanitized command is created, and the hash is put in a hash-table (referred to herein, for example, as directory_cache). Once a computation is done, it should be saved in the hash-table as the value, with the key as the computed hash. If a new message arrives and its hash is there in the directory_cache, the message can be serviced from the cache.

In one or more embodiments of the invention, optimization can include taking advantage of caching in compute nodes via, for example, the following. A compute node can be dedicated for a virtual node. This will ensure that the computational software always remains in memory and in the cache. Also, if the successor job is in the same neighborhood, then assign it to the same compute node as the previous job. This will reduce communication, and improve performance by taking advantage of caching and paging.

FIG. 5A is a block diagram illustrating an example embodiment, according to an aspect of the invention. By way of illustration, FIG. 5A depicts a main directory component 502, which interacts with virtual node 504 as well as with directory 516. Virtual node 504 includes a directory 506, which interacts with real nodes 508, 510, 512 and 514. Directory 516 interacts with real nodes 518, 520, 522 and 524. Further, directory 516 interacts with real nodes 518, 520, 522 and 524 also constitute a virtual node.

As depicted in FIG. 5A, the message that is sent to the directory is forwarded to the real nodes. The real nodes send back a message, wherein such a message can include, by way of example, the following:

```
<message id>
<dag id>
<output>
```

FIG. 5B is a block diagram illustrating an example embodiment, according to an aspect of the invention. By way of illustration, FIG. 5B depicts a directory 526, which includes the following components. A neighborhood map 528 includes a real node 530 and a machine address 532. A virtual node map 534 includes a virtual node number 536 and a directory server 538. A directory cache 540 includes a hash of inputs 542 and outputs 544. A successor list 546 includes a virtual node number 548. A virtual node cache 554 includes a virtual node 556 and an address of the directory 558. Further, the directory 526 includes a message buffer 550 and a message count list 552.

Figure 5C:
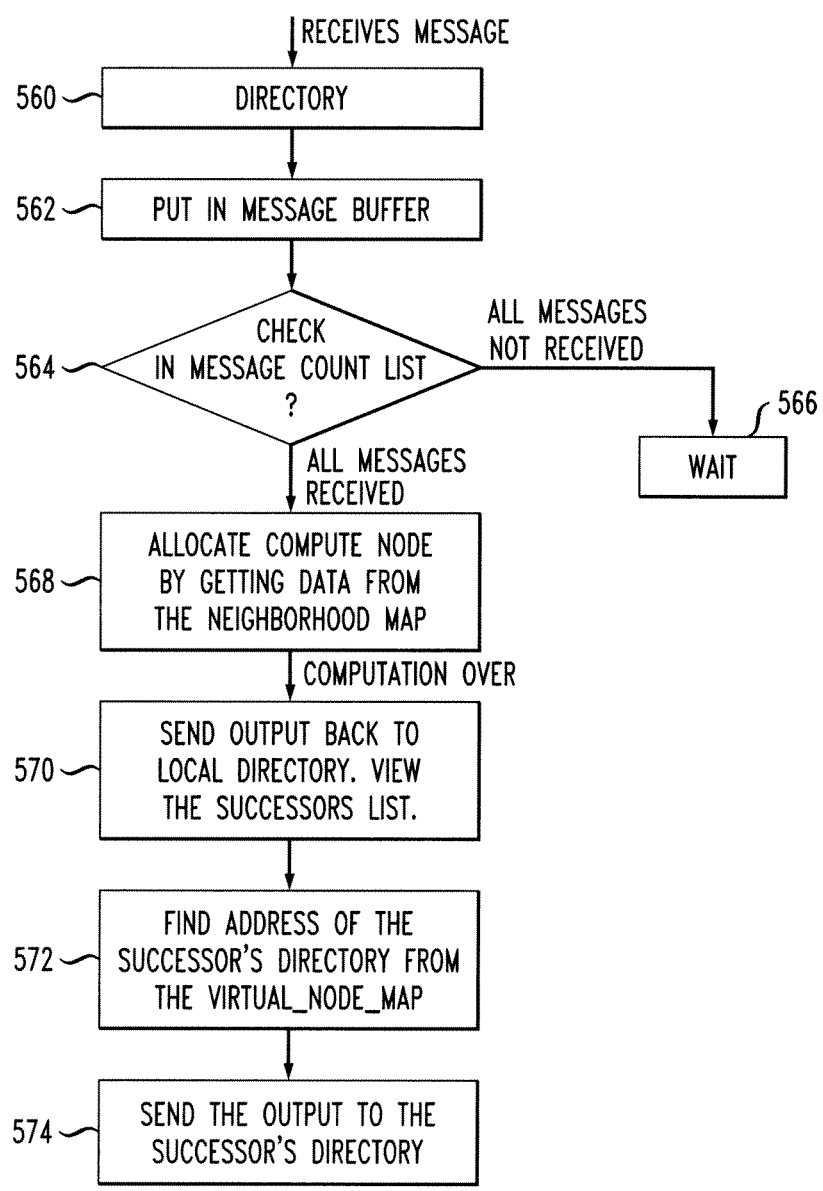
FIG. 5C is a flow diagram illustrating a steady state operation, according to an aspect of the invention.

FIG. 5C is a flow diagram illustrating a steady state operation, according to an aspect of the invention. Step 560 includes a directory receiving a message. Step 562 includes the directory putting the message in a message buffer. Step 564 includes checking in the message count list to make a receipt determination. If all of the messages have not been received, one proceeds to step 566 and waits. If all of the messages have been received, then one proceeds to step 568 and allocates a compute node by obtaining data from the neighborhood map (at which point, the computation is over).

Step 570 includes sending an output back to the local directory, as well as viewing the successors list. Step 572 includes finding an address of the successor's directory from the virtual node map. Further, step 574 includes sending the output to the successor's directory.

Figure 6:
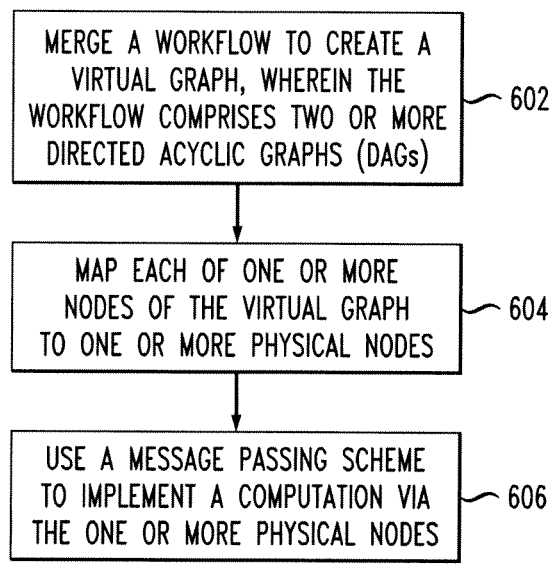
FIG. 6 is a flow diagram illustrating techniques for implementing a workflow, according to an embodiment of the invention.

FIG. 6 is a flow diagram illustrating techniques for implementing a workflow, according to an embodiment of the present invention. Step 602 includes merging a workflow to create a virtual graph, wherein the workflow comprises two or more directed acyclic graphs (DAGs) (for example, all of the merged nodes can be represented by one virtual node). Merging a workflow can include, for example, merging DAGs even if the DAGs do not have the same predecessor and/or successor. Also, merging a workflow to create a virtual graph can include identifying two or more similar jobs, marking the two or more similar jobs with a same label, and assigning the two or more similar jobs to a same virtual node. As described herein, a virtual node is a single task, and a virtual graph is a set of tasks with an ordering defined between them.

Further, merging a workflow can additionally include maximizing a number of nodes in the DAGs having a same numerical label, wherein maximizing the number of nodes in the DAGs having the same numerical label includes searching for an unmapped node with a same computation as a mapped node.

Step 604 includes mapping each of one or more nodes of the virtual graph to one or more physical nodes. Step 606 includes using a message passing scheme to implement a computation via the one or more physical nodes. By way of example, the computation includes the information and/or instruction specified in the message, such as "find all files with name 'X'." Using a message passing scheme to implement a computation can include, for example, parsing a message (for example, via a directory) to determine a DAG identification (ID) of the message, putting (for example, via the directory) the message in a corresponding buffer, and beginning a process of executing a job if a size of the buffer is equal to a number of messages the buffer has to have before beginning its execution. Beginning a process of executing the message can include finding (via, for example, the directory) a compute node corresponding to the DAG ID of the message (or, for example, assigning a new node), and sending the message as a job.

The techniques depicted in FIG. 6 can additionally include using a message passing scheme to queue computations in a node depending on resources and licenses available in the node. Also, one or more embodiments of the invention include using a directory-based system in a virtual node directory to keep track of merging operations that have been performed. Each directory, as detailed herein, can include a buffer corresponding to each DAG identification (ID) to store one or more messages.

Also, the techniques depicted in FIG. 6 can include using a message ID to track one or more messages (or computations) in merged DAGs. Further, one or more embodiments of the invention include optimizing implementation of the workflow. Optimizing implementation of the workflow can include, for example, using a cache (for example, in each directory), wherein the cache saves message contents and a message output, and servicing a new message from the cache upon arrival of the new message if the new message comprises a value in the cache.

The techniques depicted in FIG. 6 can also, as described herein, include providing a system, wherein the system includes distinct software modules, each of the distinct software modules being embodied on a tangible computer-readable recordable storage medium. The distinct software modules can include, for example, a directory module, a neighborhood map module, a virtual node map module, a directory cache module, a successor list module, a message buffer module, a message count list module and a virtual node cache module executing on a hardware processor Additionally, the techniques depicted in FIG. 6 can be implemented via a computer program product that can include computer useable program code that is stored in a computer readable storage medium in a data processing system, and wherein the computer useable program code was downloaded over a network from a remote data processing system. Also, in one or more embodiments of the invention, the computer program product can include computer useable program code that is stored in a computer readable storage medium in a server data processing system, and wherein the computer useable program code are downloaded over a network to a remote data processing system for use in a computer readable storage medium with the remote system.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

One or more embodiments of the invention, or elements thereof, can be implemented in the form of an apparatus including a memory and at least one processor that is coupled to the memory and operative to perform exemplary method steps.

Figure 7:
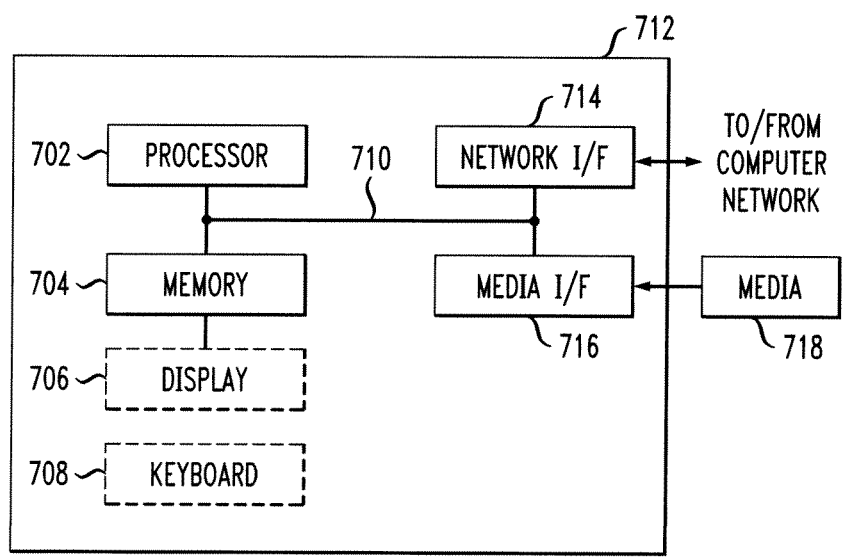
FIG. 7 is a system diagram of an exemplary computer system on which at least one embodiment of the invention can be implemented.

One or more embodiments can make use of software running on a general purpose computer or workstation. With reference to FIG. 7, such an implementation might employ, for example, a processor 702, a memory 704, and an input/ output interface formed, for example, by a display 706 and a keyboard 708. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, one or more mechanisms for inputting data to the processing unit (for example, mouse), and one or more mechanisms for providing results associated with the processing unit (for example, printer). The processor 702, memory 704, and input/output interface such as display 706 and keyboard 708 can be interconnected, for example, via bus 710 as part of a data processing unit 712. Suitable interconnections, for example via bus 710, can also be provided to a network interface 714, such as a network card, which can be provided to interface with a computer network, and to a media interface 716, such as a diskette or CD-ROM drive, which can be provided to interface with media 718.

Accordingly, computer software including instructions or code for performing the methodologies of the invention, as described herein, may be stored in one or more of the associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 702 coupled directly or indirectly to memory elements 704 through a system bus 710. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including but not limited to keyboards 708, displays 706, pointing devices, and the like) can be coupled to the system either directly (such as via bus 710) or through intervening I/O controllers (omitted for clarity).

Network adapters such as network interface 714 may also be coupled to the system to enable the data processing system to become coupled to other data processing systems or remote printers or storage devices through intervening private or public networks. Modems, cable modem and Ethernet cards are just a few of the currently available types of network adapters.

As used herein, including the claims, a "server" includes a physical data processing system (for example, system 712 as shown in FIG. 7) running a server program. It will be understood that such a physical server may or may not include a display and keyboard.

As noted, aspects of the present invention may take the form of a computer program product embodied in one or more computer readable medium(s) having computer readable program code embodied thereon. Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. Media block 718 is a non-limiting example. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction implementation system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction implementation system, apparatus, or device.

Program code embodied on a computer readable medium may be transmitted using any appropriate medium, including but not limited to wireless, wireline, optical fiber cable, radio frequency (RF), etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, component, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be implemented substantially concurrently, or the blocks may sometimes be implemented in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It should be noted that any of the methods described herein can include an additional step of providing a system comprising distinct software modules embodied on a computer readable storage medium; the modules can include, for example, any or all of the components shown in FIG. 5. The method steps can then be carried out using the distinct software modules and/or sub-modules of the system, as described above, executing on one or more hardware processors 702. Further, a computer program product can include a computer-readable storage medium with code adapted to be implemented to carry out one or more method steps described herein, including the provision of the system with the distinct software modules.

In any case, it should be understood that the components illustrated herein may be implemented in various forms of hardware, software, or combinations thereof; for example, application specific integrated circuit(s) (ASICS), functional circuitry, one or more appropriately programmed general purpose digital computers with associated memory, and the like. Given the teachings of the invention provided herein, one of ordinary skill in the related art will be able to contemplate other implementations of the components of the invention.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

At least one embodiment of the invention may provide one or more beneficial effects, such as, for example, improving workflow engines by merging workflows.

It will be appreciated and should be understood that the exemplary embodiments of the invention described above can be implemented in a number of different fashions. Given the teachings of the invention provided herein, one of ordinary skill in the related art will be able to contemplate other implementations of the invention. Indeed, although illustrative embodiments of the present invention have been described herein with reference to the accompanying drawings, it is to be understood that the invention is not limited to those precise embodiments, and that various other changes and modifications may be made by one skilled in the art.

What is claimed is:

1. A computer program product comprising a tangible computer readable recordable storage memory including computer useable program code for implementing a workflow, the computer program product including:
    computer useable program code for merging a workflow to create a virtual graph, wherein the workflow comprises two or more directed acyclic graphs (DAGs), wherein said merging comprises:
        applying a label to each node of the two or more directed acyclic graphs, wherein nodes representing a same computation in each directed acyclic graph have a same label applied thereto;
        assigning each node in the two or more directed acyclic graphs with a unique label to a unique node in the virtual graph; and
        assigning each node in the two or more directed acyclic graphs that shares the same label with one or more additional nodes are assigned to a same node in the virtual graph;
    computer useable program code for mapping each of one or more nodes of the virtual graph to one or more physical nodes; and
    computer useable program code for using a message passing scheme to implement a computation via the one or more physical nodes.

2. The computer program product of claim 1, wherein the computer useable program code for using a message passing scheme to implement a computation via the one or more physical nodes comprises:
    computer useable program code for parsing a message to determine a DAG identification (ID) of the message;
    computer useable program code for putting the message in a corresponding buffer;

computer useable program code for beginning a process of executing a job if a size of the buffer is equal to a number of messages the buffer has to have before beginning its execution.

3. The computer program product of claim 1, wherein merging a workflow to create a virtual graph comprises merging two or more DAGs even if the two or more DAGs do not have a same predecessor.

4. The computer program product of claim 1, wherein merging a workflow to create a virtual graph comprises merging two or more DAGs even if the two or more DAGs do not have a same successor.

5. The computer program product of claim 1, wherein merging a workflow to create a virtual graph comprises maximizing a number of nodes in the two or more DAGs having a same numerical label.

6. The computer program product of claim 1, further comprising computer useable program code for using a message passing scheme to queue one or more computations in a node depending on resources and licenses available in the node.

7. The computer program product of claim 1, further comprising computer useable program code for using a directory-based system in a virtual node directory to keep track of one or more merging operations that have been performed.

8. The computer program product of claim 1, further comprising computer useable program code for using a message ID to track one or more messages in one or more merged DAGs.

9. A system for implementing a workflow, comprising:
a memory; and
at least one processor coupled to the memory and operative to:
merge a workflow to create a virtual graph, wherein the workflow comprises two or more directed acyclic graphs (DAGs), wherein said merging comprises:
applying a label to each node of the two or more directed acyclic graphs, wherein nodes representing a same computation in each directed acyclic graph have a same label applied thereto;
assigning each node in the two or more directed acyclic graphs with a unique label to a unique node in the virtual graph; and
assigning each node in the two or more directed acyclic graphs that shares the same label with one or more additional nodes are assigned to a same node in the virtual graph;
map each of one or more nodes of the virtual graph to one or more physical nodes; and
use a message passing scheme to implement a computation via the one or more physical nodes.

10. The system of claim 9, wherein the at least one processor coupled to the memory operative to use a message passing scheme to implement a computation via the one or more physical nodes is further operative to:
parse a message to determine a DAG identification (ID) of the message;
put the message in a corresponding buffer;
begin a process of executing a job if a size of the buffer is equal to a number of messages the buffer has to have before beginning its execution.

11. The system of claim 9, wherein merging a workflow to create a virtual graph comprises merging two or more DAGs even if the two or more DAGs do not have a same predecessor.

12. The system of claim 9, wherein merging a workflow to create a virtual graph comprises merging two or more DAGs even if the two or more DAGs do not have a same successor.

13. The system of claim 9, wherein merging a workflow to create a virtual graph comprises maximizing a number of nodes in the two or more DAGs having a same numerical label.

14. The system of claim 9, wherein the at least one processor coupled to the memory is further operative to use a message passing scheme to queue one or more computations in a node depending on resources and licenses available in the node.

15. The system of claim 9, wherein the at least one processor coupled to the memory is further operative to use a directory-based system in a virtual node directory to keep track of one or more merging operations that have been performed.

16. The system of claim 9, wherein the at least one processor coupled to the memory is further operative to use a message ID to track one or more messages in one or more merged DAGs.

* * * * *